(12) United States Patent
Hashiba

(10) Patent No.: US 7,696,658 B2
(45) Date of Patent: Apr. 13, 2010

(54) MAGNET GENERATOR

(75) Inventor: Mitsuharu Hashiba, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 321 days.

(21) Appl. No.: 11/762,999

(22) Filed: Jun. 14, 2007

(65) Prior Publication Data

US 2008/0143204 A1  Jun. 19, 2008

(30) Foreign Application Priority Data

Dec. 19, 2006 (JP) .............................. 2006-341173

(51) Int. Cl.
 *H02K 1/32* (2006.01)
 *H02K 9/02* (2006.01)
 *H02K 9/06* (2006.01)
 *H02K 21/22* (2006.01)

(52) U.S. Cl. ..................... 310/61; 310/58; 310/153; 310/156.12

(58) Field of Classification Search ............ 310/58, 310/61, 153, 156.12, 156.26
See application file for complete search history.

(56) References Cited

U.S. PATENT DOCUMENTS

| 2,369,896 | A | * | 2/1945 | Harris et al. ............... 83/685 |
| 4,363,982 | A | * | 12/1982 | Kaminski ................... 310/61 |
| 4,684,835 | A | * | 8/1987 | Kline et al. ................. 310/59 |
| 5,732,587 | A | * | 3/1998 | Maeda et al. ............... 72/348 |
| 5,925,960 | A | * | 7/1999 | Hayes ......................... 310/211 |
| 6,384,494 | B1 | * | 5/2002 | Avidano et al. ............. 310/58 |
| 6,429,564 | B1 | * | 8/2002 | Uemura et al. ............. 310/153 |
| 6,750,578 | B2 | * | 6/2004 | Buening et al. ............. 310/89 |
| 6,815,849 | B2 | * | 11/2004 | Serizawa et al. ............ 310/62 |
| 7,015,606 | B2 | * | 3/2006 | Huang et al. ................ 310/63 |
| 7,078,834 | B2 | * | 7/2006 | Liu .............................. 310/64 |
| 7,122,924 | B2 | * | 10/2006 | Lee .............................. 310/62 |
| 2002/0145348 | A1 | * | 10/2002 | Anma ......................... 310/91 |
| 2004/0164628 | A1 | * | 8/2004 | Serizawa et al. ............ 310/61 |
| 2005/0236916 | A1 | * | 10/2005 | Uemura et al. ............. 310/58 |
| 2006/0158050 | A1 | * | 7/2006 | Maeda et al. ............... 310/58 |

FOREIGN PATENT DOCUMENTS

| JP | 2000-52157 A | | 2/2000 |
| JP | 2001-136720 | * | 5/2001 |
| JP | 2002-315245 A | | 10/2002 |
| JP | 2003-88055 A | | 3/2003 |

* cited by examiner

Primary Examiner—Burton Mullins
(74) Attorney, Agent, or Firm—Sughrue Mion, PLLC

(57) ABSTRACT

A magnet generator including a bowl-shaped flywheel which is formed of a cylindrical portion and a bottom portion on one end side of the cylindrical portion, a plurality of magnets which are arranged on the inner peripheral surface of the cylindrical portion of the flywheel, and a power generation coil which generates power under an electromagnetic induction action with the magnets and which is disposed in opposition to the magnets within the flywheel, wherein the flywheel has a plurality of vent holes in its bottom portion, and the hole base part of each of the vent holes is formed in a droop or curved shape. Owing to the droop or curved shape, a cooling efficiency is enhanced, and a job for treating burrs and laps after cutting working can be relieved to enhance a productivity.

5 Claims, 7 Drawing Sheets

MAGNET GENERATOR

BACKGROUND OF THE INVENTION

1. Field of the Invention

This invention relates to a magnet generator which generates power under the electromagnetic induction action between magnets and an armature winding, on the basis of the rotation of a flywheel.

2. Description of the Related Art

In a prior-art magnet generator, on account of an alternating magnetic field generated by magnets during the rotation of a flywheel, a hysteresis loss and an eddy current loss occur in a laminated core, and a copper loss and various thermal losses exist in a winding coil contributing to power generation. The resistance of the power generation coil is increased by the various thermal losses, resulting in the problem of decrease in an output current. In the flywheel (rotor) of the magnet generator, therefore, a plurality of vent holes having a large area are provided in a bowl-shaped bottom surface in order to enhance a cool performance (ventilation efficiency) and a power generation efficiency. It has also been known that the bottom portion of the flywheel is provided with a plurality of fins, by which the forcible stream of air is generated with the rotation of the flywheel, thereby to promote the cooling of the power generation coil. (Refer to JP-A-2002-101630, JP-A-2003-324899 and JP-A-2003-333801.)

In the fabrication of such fins, however, the fins must be made integral with the flywheel by insert molding, and a job which requires a large number of man-hour with a dedicated resin forming mold is involved, resulting in the problem that a fabricating cost becomes high. With the intention of eliminating such a problem, it has been proposed that, instead of the provision of the fins, protuberances which protrude onto the side of the power generation coil are formed at the peripheral edge parts of the vent holes by plastic deformation process, whereby the turbulence of air streams is generated in the flywheel by the rotation of this flywheel. (Refer to JP-A-2005-318685.)

With that flywheel (rotor) of the prior-art magnet generator which is formed with the protuberances, a cooling performance is enhanced. However, burring working, etc. must be performed in order to form the protuberances at the peripheral edge parts of the vent holes, and complications are still existent in a fabricating process for the protuberances. Moreover, a large number of vent holes of large area are required in order to efficiently decrease the heat generation of the power generation coil by ventilation and to suppress the lowering of the output current, and a plurality of screw holes are required among the vent holes in order to assemble a flywheel mounting component (such as a one-way clutch), so that the rigidity of the flywheel (bottom surface) is apprehended.

Therefore, the plate thickness of the flywheel has increased in order to ensure the rigidity of the flywheel bottom surface. Besides, since the vent holes of the flywheel and the screw holes thereof are mostly formed by cutting working, a long time has expended on the working of a thick plate, and a high working cost has been required for treating burrs and laps after the cutting working.

SUMMARY OF THE INVENTION

This invention has been made in order to eliminate the problems as stated above, and it has for its object to obtain a magnet generator in which the hole base part of each of vent holes provided in the flywheel (rotor) of the magnet generator is formed in a droop or curved shape, thereby to enhance a cooling efficiency and to eliminate the need for treatment of burrs and laps after cutting, so that the remarkable enhancement of a productivity is permitted.

A magnet generator according to the invention includes a bowl-shaped flywheel, a plurality of magnets and a power generation coil. The flywheel is formed of a cylindrical portion, and a bottom portion joining to the cylindrical portion. The magnets are arranged on an inner peripheral surface of the cylindrical portion of the flywheel. The power generation coil, disposed in opposition to the magnets within the flywheel, generates power under an electromagnetic induction action with the magnets. The flywheel has a plurality of vent holes in the bottom portion thereof, and a droop or curved shape is formed at, at least, one hole base part of each of the vent holes.

According to the invention, the hole base part of each of the plurality of vent holes provided in the bowl-shaped flywheel (rotor) is formed in the droop or curved shape, whereby the magnet generator whose cooling efficiency and power generation efficiency are enhanced can be obtained. Besides, owing to the droop or curved shape of the hole base part of each of the vent holes, the magnet generator which eliminates the need for treatment of burrs and laps after cutting and which permits remarkable reduction in cost can be obtained. Further, the vent holes are formed at a forging working step, whereby the magnet generator which permits remarkable enhancement in productivity can be obtained.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Embodiment 1

An embodiment of a magnet generator applying this invention will be described.

Figure 1:
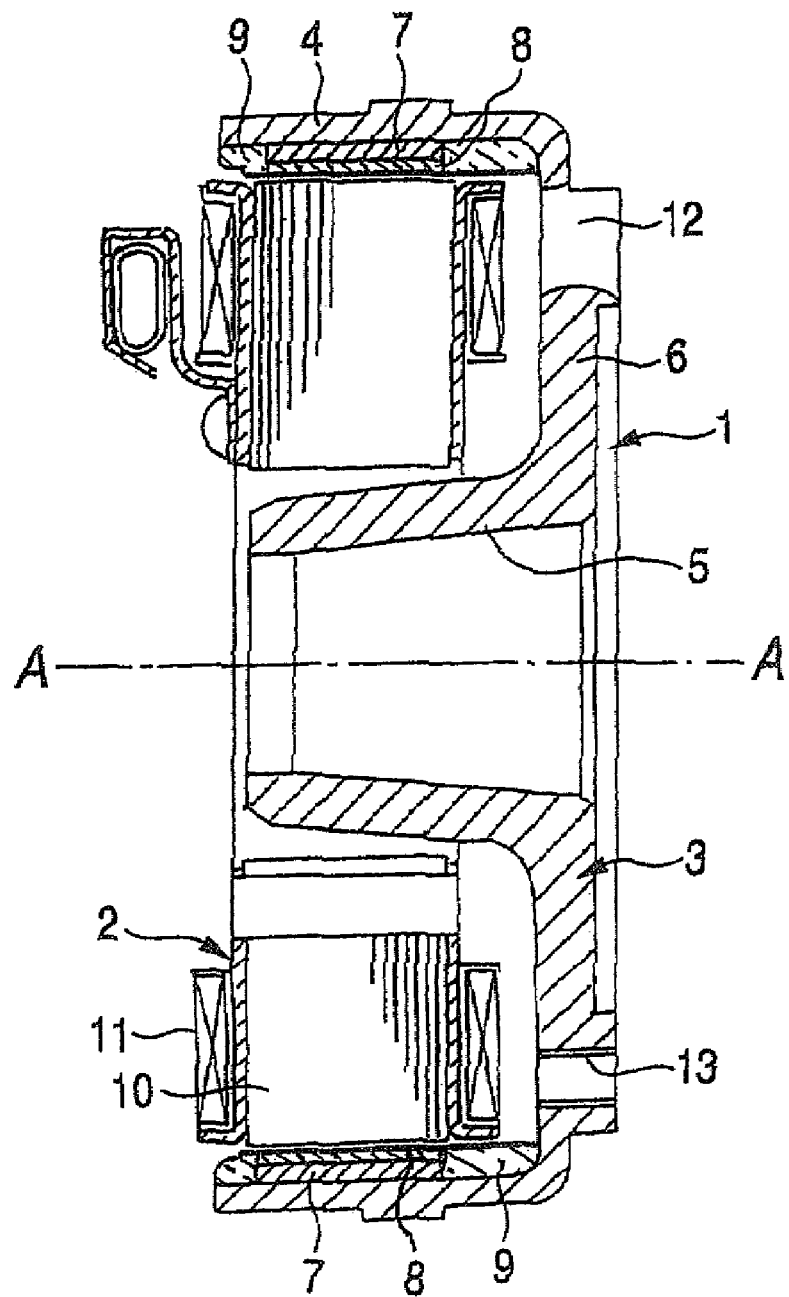
FIG. 1 is a vertical sectional view showing a magnet generator according to Embodiment 1 of this invention.
Figure 2:
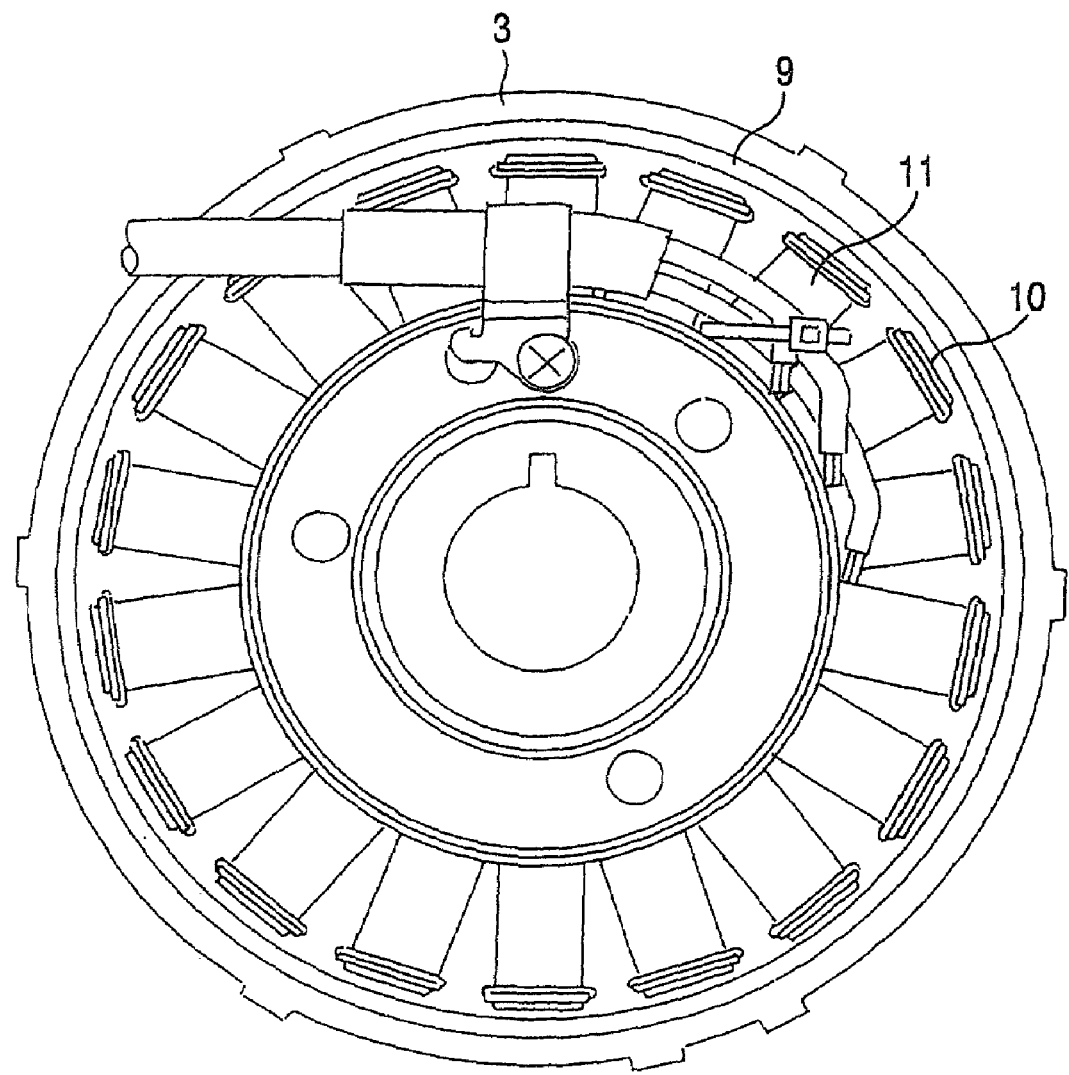
FIG. 2 is a left side view in FIG. 1.

FIG. 1 is a vertical sectional view showing a magnet generator according to Embodiment 1 of this invention, while FIG. 2 is a left side view in FIG. 1. The magnet generator includes a rotor 1 which is connected with an internal combustion engine, and a stator 2 which is attached to a fixing member (not shown) in opposition to the rotor 1. The rotor 1 has a bowl-shaped flywheel 3, which includes an outer peripheral cylindrical portion 4, a boss portion 5 inside the cylindrical portion 4, and a bottom portion 6 joining the cylindrical portion 4 and the boss portion 5, and which is rotated about the axis of rotation A-A. The boss portion 5 is fixed to a rotational shaft (not shown) which is driven to rotate by the internal combustion engine.

A plurality of permanent magnets 7 are fixed to the inner peripheral surface of the cylindrical portion 4 of the flywheel 3. The plurality of permanent magnets 7 are arranged at a predetermined angular intervals equal to one another, around the axis of rotation A-A, and the adjacent permanent magnets 7 are magnetized in polarities opposite to each other, whereby the permanent magnets 7 generate magnetic fields whose directions change alternately. Besides, a cylindrical protective ring 8 for assembling the magnets 7 is fitted in close contact with the inner peripheral surfaces of the respective permanent magnets 7. Resin or molded members 9 are packed into spaces outside both the ends of each permanent magnet 7 in the direction of the axis of rotation A-A, and into the mutual intervals of the respective permanent magnets 7 in the circumferential direction of the flywheel 3.

Owing to the molded members 9, the plurality of permanent magnets 7 and the protective ring 8 are fixed to the inner peripheral surface of the cylindrical portion 4 of the flywheel 3. Numeral 10 designates a laminated core which is made up of a plurality of steel sheets, and which is disposed inside the flywheel 3 so as to oppose to the permanent magnets 7. Numeral 11 designates a power generation coil which is wound round the laminated core 10. A plurality of vent holes 12 are provided in the inner side surface of the flywheel 3. A plurality of screw holes 13 serve to fix a flywheel mounting component (such as a clutch).

The plurality of vent holes 12 are formed at circumferential intervals in the bottom portion 6 of the flywheel 3. Each of the vent holes 12 has its hole base part formed in a droop or curved shape. Although a fabricating method for the droop shape will be described later, this droop shape is formed into a substantially round shape which is cut in excess of an ordinary chamfering quantity (C 0.5-1.0).

Figure 3:
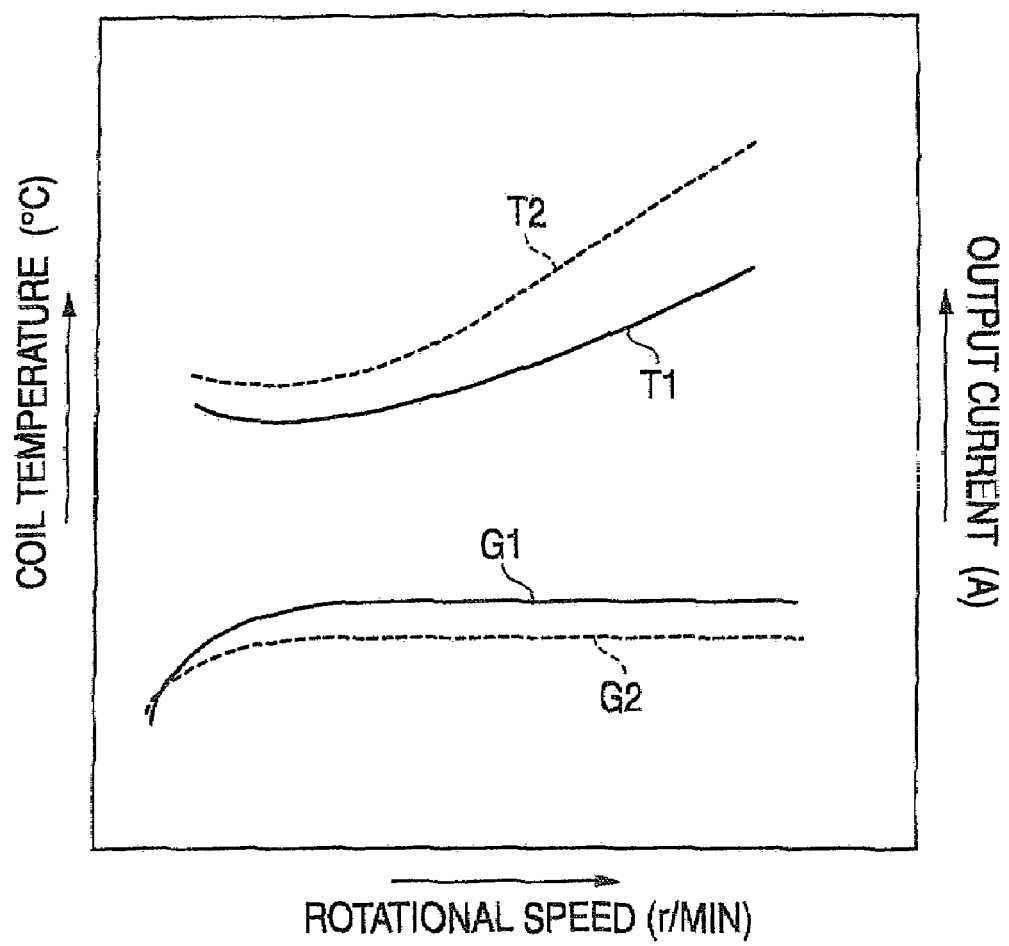
FIG. 3 is a temperature graph showing the advantages of the invention.

FIG. 3 shows a temperature graph which has experimentally proved that the droop or curved shape is formed at the hole base part of each vent hole of the flywheel, whereby the lowering of a coil saturation temperature, namely, the enhancement of an output current is attained. Referring to the figure, the axis of abscissas represents the drive rotational speed (revolutions/minute) of the magnet generator, while the axis of ordinates represents the temperature (° C.) of the power generation coil 11 on the left side and the output current (A) of the power generation coil 11 on the right side. As a comparative example, the temperature characteristic of a magnet generator in which the hole base part of each vent hole does not have the droop shape is indicated as T2, and the power generation characteristic thereof is indicated as G2. Incidentally, the temperature is the saturation temperature. It has been verified from the experimental results that, when Embodiment 1 is compared with the comparative example, the temperature characteristic T1 of the power generation coil 11 lowers sharply, and that, owing to the lowering of the temperature, also the resistance of the power generation coil 11 lowers to increase the power generation quantity G1, so a power generation efficiency is enhanced.

Besides, as understood from the following equation of the Bernoulli theorem concerning a fluid, the passage area change of each vent hole becomes equal to the change of the flow velocity of a cooling medium, and hence, the efficient taking-in (suction) and taking-out (discharge) of a ventilation stream can be realized by the droop shape:

$$P + \tfrac{1}{2}\rho V^2 = \text{Const. } \{P: \text{pressure}, \rho: \text{density, and } V: \text{flow velocity}\}$$

Figure 4:
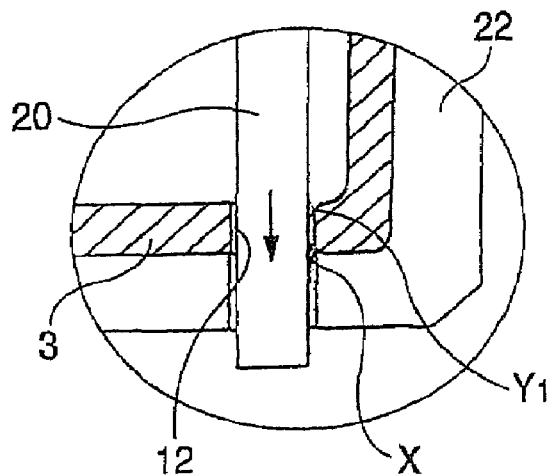
FIG. 4 is a view showing a general forging technique in the prior art.

Next, a forging step in the fabrication of each vent hole 12 will be described in comparison with the prior art, with reference to FIGS. 4 and 5. FIG. 4 shows the combination of a punch 20 (male) and dies 22 (female) in a general forging working diagram. The flywheel 3 is placed on the dies 22, and the punch 20 is caused to penetrate through the flywheel 3 in the direction of arrow, thereby to form the vent hole 12. In this case, the penetration proceeds in the direction from the punch 20 to the dies 22, on account of a mold structure, and burrs and laps X come to exist on one end surface of the vent hole 12 without fail. Besides, a slight droop Y1 appears at the other end surface.

Figure 5:
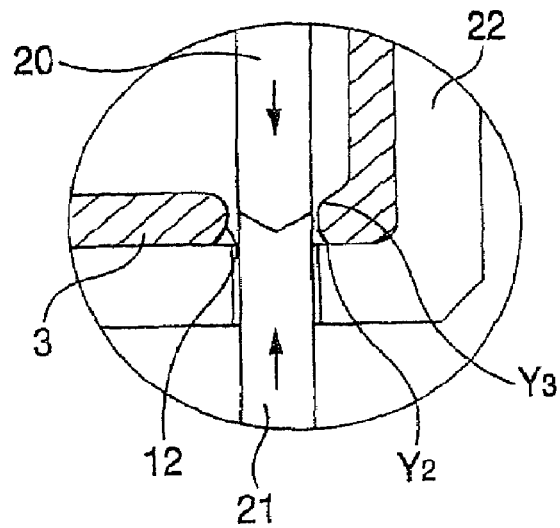
FIG. 5 is a view showing a schematic forging technique in the invention.

On the other hand, FIG. 5 shows a basic mold structure diagram according to the invention. Since a first punch 20 and a second punch 21 oppose to each other, they are butted against each other at a vent hole part. Therefore, the laps X do not appear, and the vent hole 12 having large punching droops or curves Y2 and Y3 on both its sides can be worked.

As described above, according to the magnet generator of the invention, the vent holes can be endowed with the droop shape without the existence of the burrs and laps, owing to the adoption of the forging step. Therefore, a job for treating the burrs and laps after the cutting working can be relieved, and a remarkable enhancement in productivity is expected.

Embodiment 2

Figure 6:
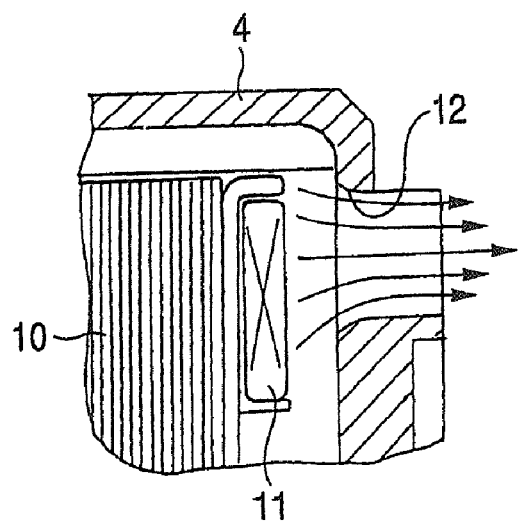
FIG. 6 is a vertical sectional view showing a modification to the droop or curved shape of each vent hole according to Embodiment 2 of the invention.
Figure 7:
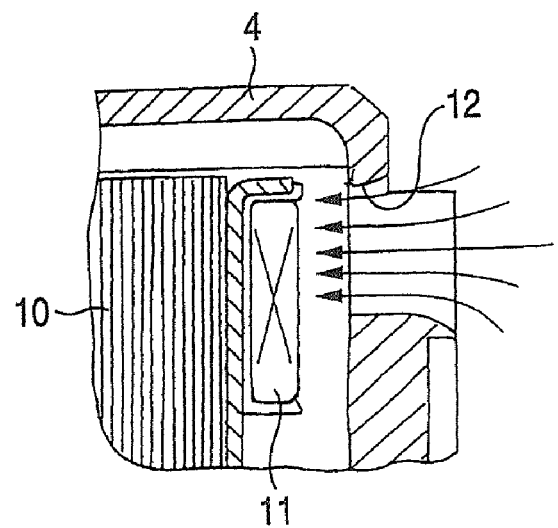
FIG. 7 is a vertical sectional view showing another modification to the droop or curved shape of each vent hole according to Embodiment 2 of the invention.

Next, FIGS. 6 and 7 show modifications to the droop shape of each vent hole according to Embodiment 2. FIG. 6 shows an example in which the hole base part of each vent hole 12 of a flywheel 3 on the side of a generator coil 11 is formed with a droop or curved shape, thereby to enhance a discharge efficiency. Besides, FIG. 7 shows an example in which the hole base part of each vent hole 12 of a flywheel 3 on the outer side of this flywheel 3 is formed with a droop or curved shape, thereby to enhance a suction efficiency.

In general, if a magnet generator lies in a gaseous atmosphere, the temperature of the interior of the flywheel 3 rises (the air pressure lowers) due to the heat generation of the power generation coil 11, and heat flows out to the exterior (a side of lower temperature) via the vent holes 12. The passage area of each of the vent holes 12 is changed (made smaller) toward the outer side of the flywheel 3 as shown in FIG. 6, whereby the flow velocity of a ventilation stream about to flow out is amplified, and a cool performance is remarkably enhanced. Further, in such a case where a forced cooling stream from the exterior exists, the droop shapes of both the ends of the hole base part of each vent hole is provided with some difference as shown in FIG. 7, whereby the enhancement of the suction efficiency of the cooling stream from outside can be attained. Needless to say, such shape changes can be easily formed by altering the shapes of the punches 20 and 21 and the dies 22.

Embodiment 3

Figure 8:
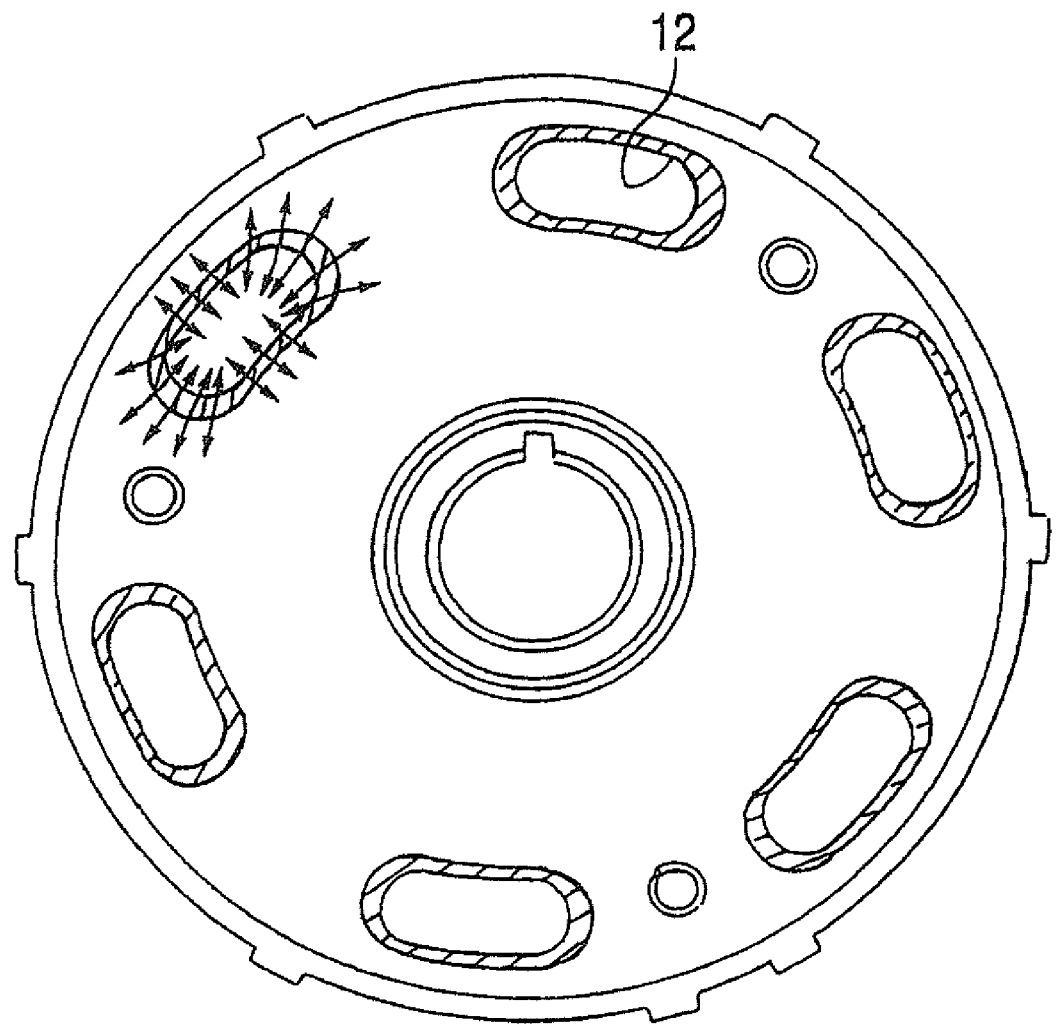
FIG. 8 is a cross-sectional view showing a still another modification to the droop or curved shape of each vent hole according to Embodiment 3 of the invention.

Next, other modifications to the droop shape of each vent hole according to Embodiment 3 will be described with reference to FIGS. 8 and 9. In the vent hole 12 of a flywheel in FIG. 8, a droop on the side of a rotational direction (circumferential direction) is made larger than a droop or curve on the side of a radial direction. Thus, a flow velocity density in the rotational direction can be enhanced to enhance a cool performance still more.

Figure 9:
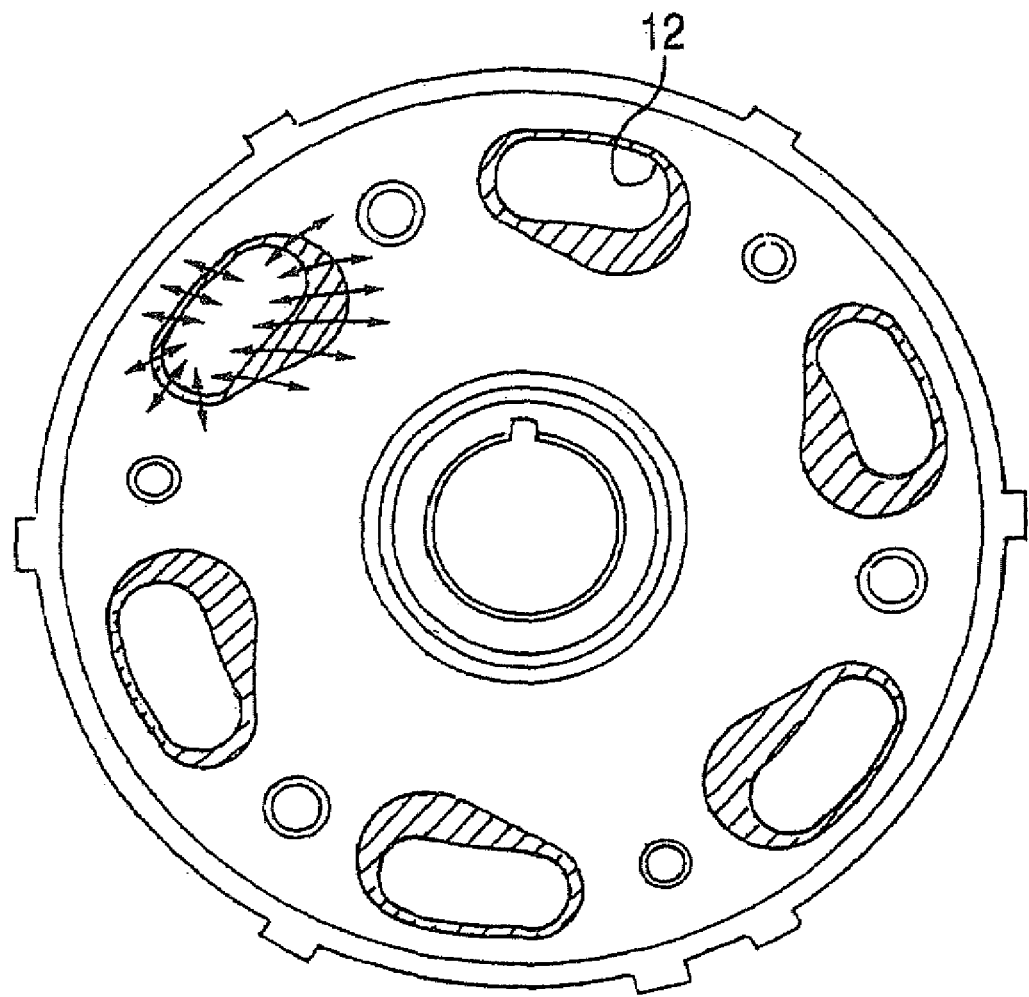
FIG. 9 is a cross-sectional view showing a yet another modification to the droop or curved shape of each vent hole according to Embodiment 3 of the invention.

On the other hand, in the vent hole 12 of a flywheel in FIG. 9, a droop or curve on the side of a rotational direction (circumferential direction) is made larger than a droop or curve on the side of a radial direction, and the drooping direction thereof is endowed with an angle. Thus, a flow velocity density distribution of streamline shape (near to a fan stream) is attained, and a cool performance is enhanced.

Incidentally, although the droop shapes of the hole base parts of the vent holes have been described as being realized by the forging working from the viewpoint of enhancement in productivity (reduction in cost), they can be realized even by cutting working (endmill working) or chamfering working as in the prior art, and a similar cooling effect is, of course, attained even in this case.

Various modifications and alterations of this invention will be apparent to those skilled in the art without departing from the scope and spirit of this invention, and it should be understood that this invention is not limited to the illustrative embodiments set forth herein.

What is claimed is:

1. A magnet generator comprising:
   a bowl-shaped flywheel which is formed of a cylindrical portion and a bottom portion connected to the cylindrical portion,
   a plurality of magnets which are arranged on an inner peripheral surface of the cylindrical portion of said flywheel, and a power generation coil which is disposed in opposition to said magnets within said flywheel to generate power under an electromagnetic induction action with said magnets,
   wherein said flywheel has a plurality of vent holes in the bottom portion thereof, and at least one of said vent holes is provided with a curved hole base part in a hole base part on the outer side of the flywheel, wherein the cross-section of the hole base part is curved, and wherein an edge of the curved hole base part is angularly offset from a centerline of the vent hole in a rotation direction of said flywheel.

2. A magnet generator according to claim 1, wherein the curved hole base part is formed in a substantially rounded shape.

3. A magnet generator according to claim 1, further including a curved hole base part on the generator side of the flywheel, wherein one of the outer-side curved hole base part and the generator-side curved hole base part is made larger than that of the other.

4. A magnet generator according to claim 1, wherein a cross-sectional area of the curved hole base part of the vent hole which exists on a side in a rotational direction (circumferential direction) of said flywheel is made larger than a cross-sectional area of the curved hole base part which exists on a side in a radial direction of said flywheel.

5. A magnet generator according to claim 1, wherein the curved hole base part of each of the vent holes is formed by forging.

* * * * *